United States Patent
Schnitzler et al.

(10) Patent No.: US 12,415,253 B2
(45) Date of Patent: *Sep. 16, 2025

(54) FASTENER DRIVER

(71) Applicant: HONEYWELL FEDERAL MANUFACTURING & TECHNOLOGIES, LLC, Kansas City, MO (US)

(72) Inventors: Joshua Michael Schnitzler, Lee's Summit, MO (US); Donald Conrad Branson, Kansas City, MO (US)

(73) Assignee: Honeywell Federal Manufacturing & Technologies, LLC, Kansas City, MO (US)

( * ) Notice: Subject to any disclaimer, the term of this patent is extended or adjusted under 35 U.S.C. 154(b) by 272 days.

This patent is subject to a terminal disclaimer.

(21) Appl. No.: 17/097,236

(22) Filed: Nov. 13, 2020

(65) Prior Publication Data

US 2021/0205964 A1    Jul. 8, 2021

Related U.S. Application Data

(63) Continuation of application No. 15/615,639, filed on Jun. 6, 2017, now Pat. No. 10,864,618.

(51) Int. Cl.
| | |
|---|---|
| *B25B 15/00* | (2006.01) |
| *B25B 23/10* | (2006.01) |
| *B25G 3/28* | (2006.01) |
| *F16B 23/00* | (2006.01) |

(52) U.S. Cl.
CPC .......... *B25B 15/004* (2013.01); *B25B 23/105* (2013.01); *B25G 3/28* (2013.01); *F16B 23/0007* (2013.01); *F16B 23/0038* (2013.01)

(58) Field of Classification Search
CPC ....... B25B 15/00; B25B 23/10; B25B 23/101; B25B 23/105; B25B 23/108; B25B 23/106; B25G 3/28; B25G 1/005; F16B 23/0007; F16B 23/0038
See application file for complete search history.

(56) References Cited

U.S. PATENT DOCUMENTS

| | | | | |
|---|---|---|---|---|
| 2,301,590 A | * | 11/1942 | Signorelli | B25B 23/106 81/448 |
| 2,324,153 A | * | 7/1943 | Hagness | B25B 23/106 411/407 |
| 2,562,347 A | * | 7/1951 | Young | B25B 23/106 81/444 |
| 2,657,724 A | * | 11/1953 | Shaff | B25B 23/106 81/444 |

(Continued)

FOREIGN PATENT DOCUMENTS

WO    WO-2007021850 A1 *  2/2007  ........... A61B 17/861

*Primary Examiner* — Makena S Markman
(74) *Attorney, Agent, or Firm* — Hovey Williams LLP

(57) ABSTRACT

A driver for non-magnetic gripping of a socketed fastener head. The driver includes a shank and two cantilever beams. Each cantilever beam has an end and a basal segment adjacent the shank opposite the end. The driver also includes a gap defined by the two cantilever beams in resting positions. The gap extends between the two cantilever beams from an open end toward the shank. The ends of the two cantilever beams are configured to bend into the gap from the resting positions.

19 Claims, 8 Drawing Sheets

(56) References Cited

U.S. PATENT DOCUMENTS

| | | | | |
|---|---|---|---|---|
| 2,775,913 | A | * | 1/1957 | Deliso ............... B25B 15/008 81/448 |
| 2,781,807 | A | * | 2/1957 | Labbee ............ F16B 23/0038 81/444 |
| 4,363,250 | A | * | 12/1982 | Suga .................. B25B 23/10 81/453 |
| 4,552,039 | A | * | 11/1985 | Fisher .................. B25B 9/02 294/100 |
| 6,286,401 | B1 | * | 9/2001 | Hajianpour ......... B25B 23/108 81/453 |
| 6,732,426 | B2 | * | 5/2004 | Adams ................ B25B 27/10 29/729 |
| 10,864,618 | B2 | * | 12/2020 | Schnitzler .......... B25B 15/004 |

* cited by examiner

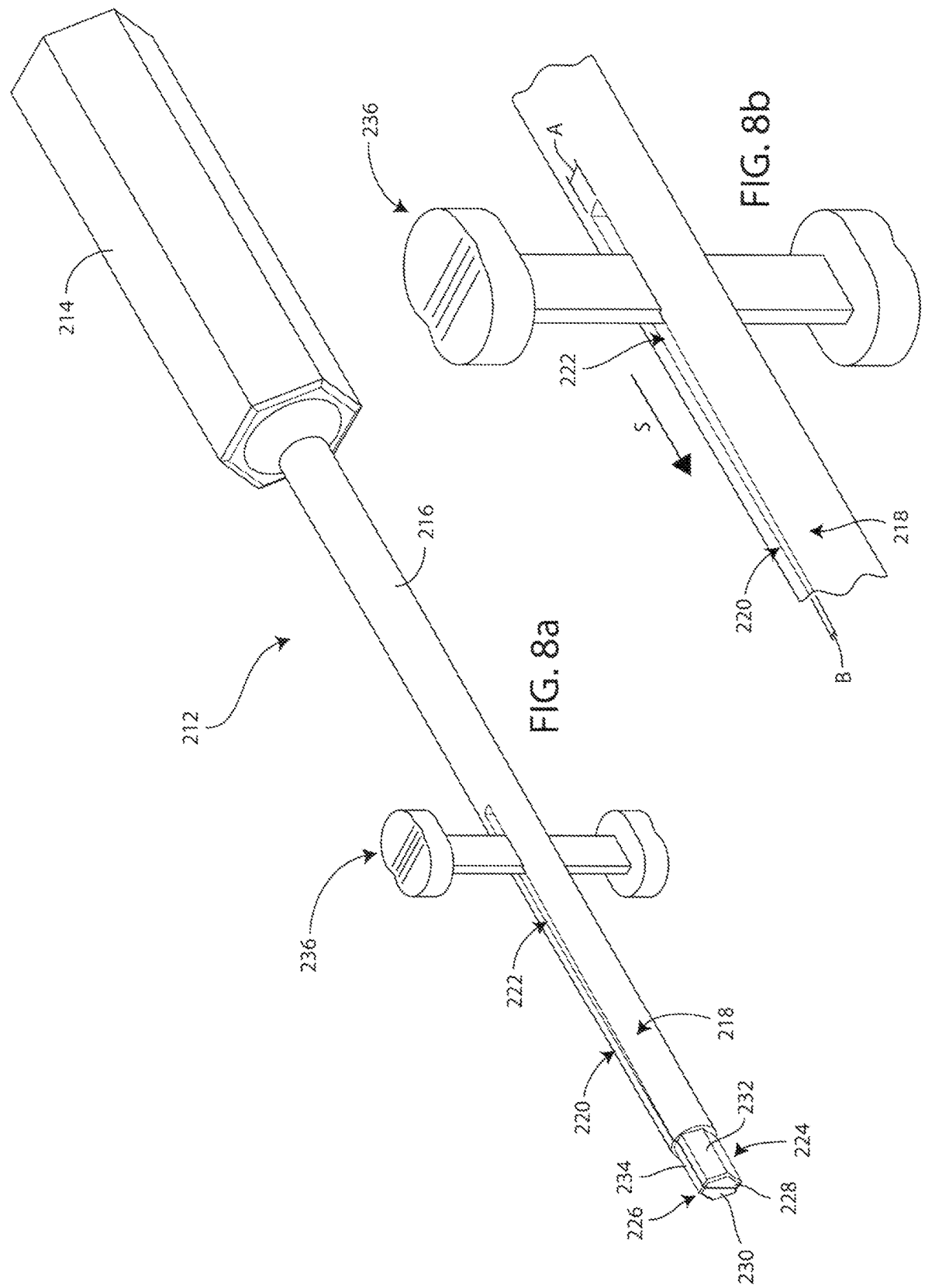

US 12,415,253 B2

FASTENER DRIVER

RELATED APPLICATION

The current patent application is a continuation patent application which claims priority benefit, with regard to all common subject matter, to identically-titled U.S. patent application Ser. No. 15/615,639, filed Jun. 6, 2017. The earlier-filed patent application is hereby incorporated by reference in its entirety into the current application.

STATEMENT REGARDING FEDERALLY-SPONSORED RESEARCH OR DEVELOPMENT

This invention was made with government support under Contract No.: DE-NA0000622 awarded by the Department of Energy. The government has certain rights in the invention.

BACKGROUND OF THE INVENTION

1. Field

This invention relates generally to the field of fastener drivers and, in particular, to drivers displaying improved fastener gripping prior to and during installation.

2. Discussion of Related Art

Conventional drivers and bits have long been plagued with fastener-gripping problems. Some outlying changes made to fastener drivers over the past several decades have sought to reduce grip—for example, for use with Phillips-head fasteners—in order to address stripping problems in high torque scenarios. However, most improvements have focused on strengthening the grip a driver has on a fastener, in order to reduce the likelihood of unintended separation during installation. For instance, U.S. Pat. No. 3,253,626 to Stillwagon et al. is directed to a magnetic pick-up fastener driver designed to increase the hold a bit has on a fastener before and during installation. Additional examples include U.S. Pat. No. 3,298,410 to Noboru and U.S. Pat. No. 7,069,826 to Tilton, each of which is directed to a screw retainer that grips the outer edges of a fastener's head to hold the fastener to the bit before and during installation.

Conventional drivers and bits that rely on attachments to grip the outer edges of fasteners during installation can be too bulky and difficult to operate. Conventional drivers and bits that rely solely on magnetic attraction to hold the fasteners can be too weak and unreliable. A driver with improved grip that addresses one or more of the foregoing concerns is needed.

SUMMARY OF THE INVENTION

The following brief description of embodiments of the invention is provided to indicate the nature of the subject matter disclosed herein. While certain aspects of the present inventive concept are described below, the summary is not intended to limit the scope of the present inventive concept.

The present inventive concept provides, in its simplest form, a solution to the aforementioned issues that includes a driver having at least two flexing cantilever beams for gripping internal surfaces of a fastener socket. Various embodiments of the present inventive concept remedy deficiencies of conventional drivers such as those previously set forth herein.

The aforementioned may be achieved in one aspect of the present inventive concept by providing a driver for gripping a socketed fastener head that includes a shank. The driver also includes two spaced-apart cantilever beams extending from the shank and defining a longitudinal gap between them. Each cantilever beam has an end and a basal segment adjacent the shank. The cantilever beams are configured to narrow the gap between the ends when transitioning from resting positions to assembled positions.

The aforementioned may be achieved in another aspect of the present inventive concept by providing a driver for gripping a socketed fastener head that includes a shank. The driver also includes two spaced-apart cantilever beams extending from the shank and defining a longitudinal gap between them. Each cantilever beam has a basal segment adjacent the shank and an end terminating at a tip. The driver also includes a sliding shim positioned in the gap. The sliding shim and cantilever beams are configured such that moving the sliding shim toward the tips, when the driver is assembled to the socketed fastener head, causes the ends to apply outward pressure on the socketed fastener head.

The aforementioned may be achieved in yet another aspect of the present inventive concept by a method for installing a fastener having a socketed head presenting a top surface and a socket formed in and below the top surface. The method includes providing a driver having two cantilever beams, where each cantilever beam includes an outward-facing surface. The method also includes aligning the driver with a socket of the socketed fastener head and applying a force to the driver causing the cantilever beams to move relative to one another, thereby applying a pressure on the socket.

Additional aspects, advantages, and utilities of the present invention will be set forth in part in the description which follows and, in part, will be obvious from the description, or may be learned by practice of the present invention.

BRIEF DESCRIPTION OF THE DRAWINGS

Embodiments of the present inventive concept are described in detail below with reference to the attached drawing figures, wherein:

FIG. 6b is an enlarged side view of a portion of the gap and of the sliding shim of the driver of FIG. 6a;

FIG. 8a is a side perspective view of a driver according to the present inventive concept including a sliding shim and cantilever beams in resting positions defining a steadily narrowing gap therebetween; and FIG. 8b is an enlarged side view of a portion of the gap and of the sliding shim of the driver of FIG. 8a.

Figure 1:
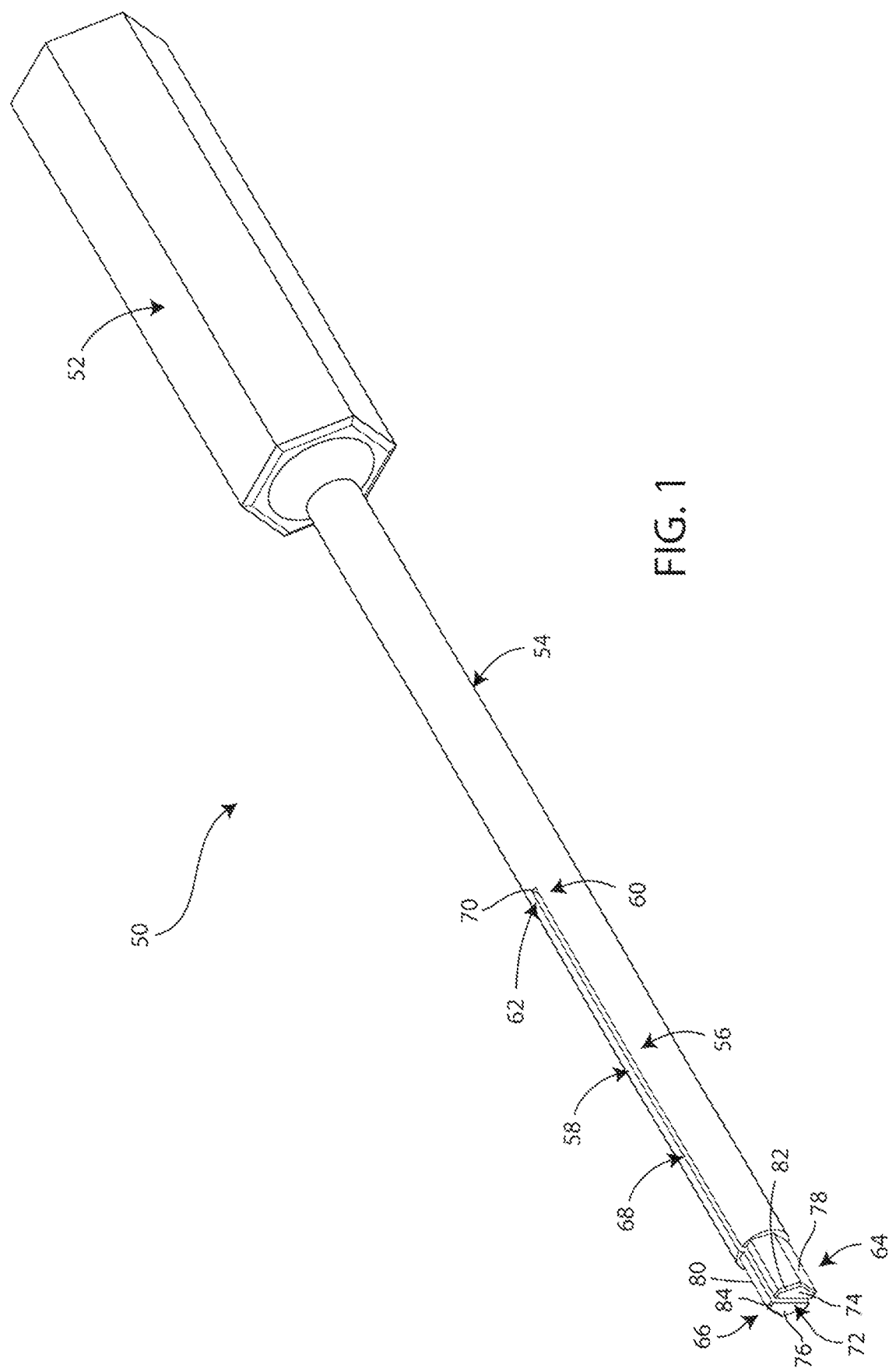
FIG. 1 is a side perspective view of a driver according to the present inventive concept presenting a hexagonal peripheral profile along a driving end that is bisected through two opposite sides by a gap.

The drawing figures do not limit the present inventive concept to the specific embodiments disclosed and described herein. The drawings are not necessarily to scale, emphasis instead being placed upon clearly illustrating the principles of the present inventive concept.

DETAILED DESCRIPTION OF THE INVENTION

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

Figure 2:
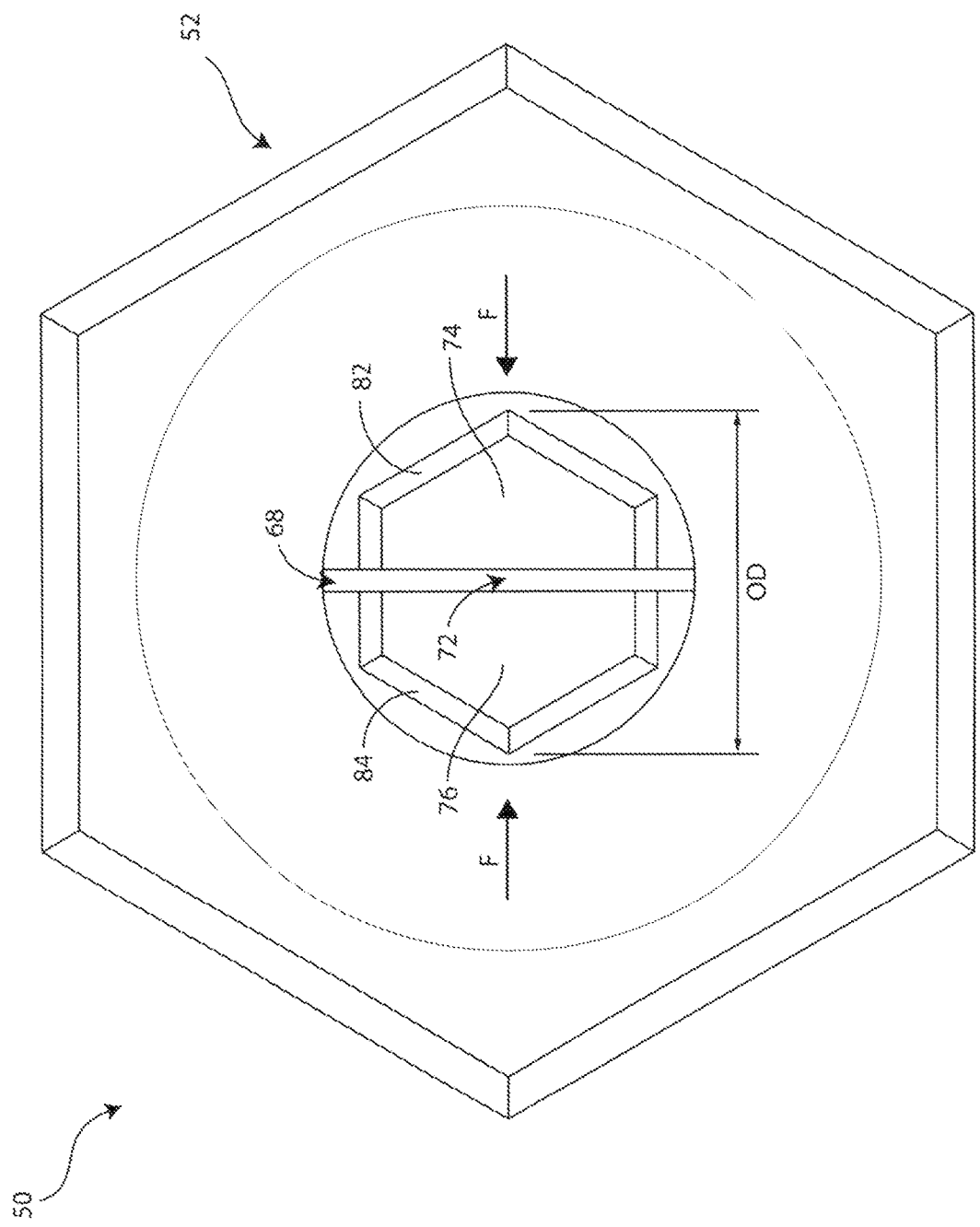
FIG. 2 is an enlarged front view of the driver of FIG. 1.

Turning to FIGS. 1-2, an exemplary driver 50 according to an embodiment of the present inventive concept is illustrated. Driver 50 includes a handle 52, a shank 54 extending from and fixed to the handle 52, and two cantilever beams 56, 58 extending from the shank 54. Cantilever beams 56, 58 respectively include basal segments 60, 62 fixed to or integral with the shank 54, as well as ends 64, 66 opposite the basal segments 60, 62. Cantilever beams 56, 58 define a gap 68 between them that extends from a terminus 70 at shank 54 to an open end 72. Ends 64, 66 include tips 74, 76 and outward-facing surfaces 78 and 80, each outward-facing surface 78, 80 comprising a plurality of angled surfaces.

The outer peripheries of tips 74, 76 extend into beveled surfaces. More particularly, between tips 74, 76 and substantially orthogonal outward-facing surfaces 78, 80 are, respectively, angled transitional or entry surfaces 82, 84. Angled entry surfaces 82, 84 each comprise a plurality of surfaces angled with respect to each other and configured to facilitate insertion of driver 50 into a socketed fastener head having a hexagonal socket, as explained in more detail below. It is foreseen that angled entry surfaces may be substantially flat, curved, substantially continuous or may take on other configurations without departing from the spirit of the present inventive concept.

Each of ends 64, 66 also presents a cross-section shaped substantially as an irregular pentagon (See FIG. 2). Viewed together, these cross-sections of ends 64, 66 present a hexagonal peripheral profile split evenly across two sides by gap 68.

Figure 3:
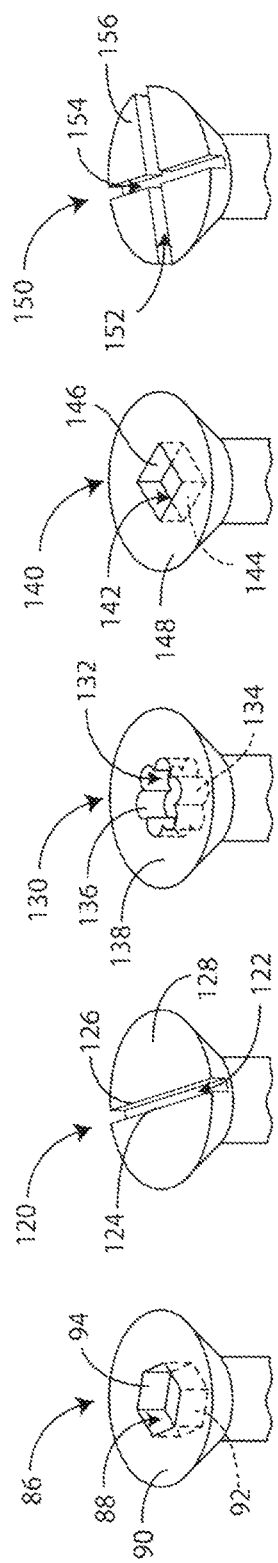
FIG. 3 illustrates multiple fasteners having varied socket types from a side perspective, each fastener being aligned above one or more compatible drivers according to the present inventive concept (illustrated from a front view)
Figure 3:
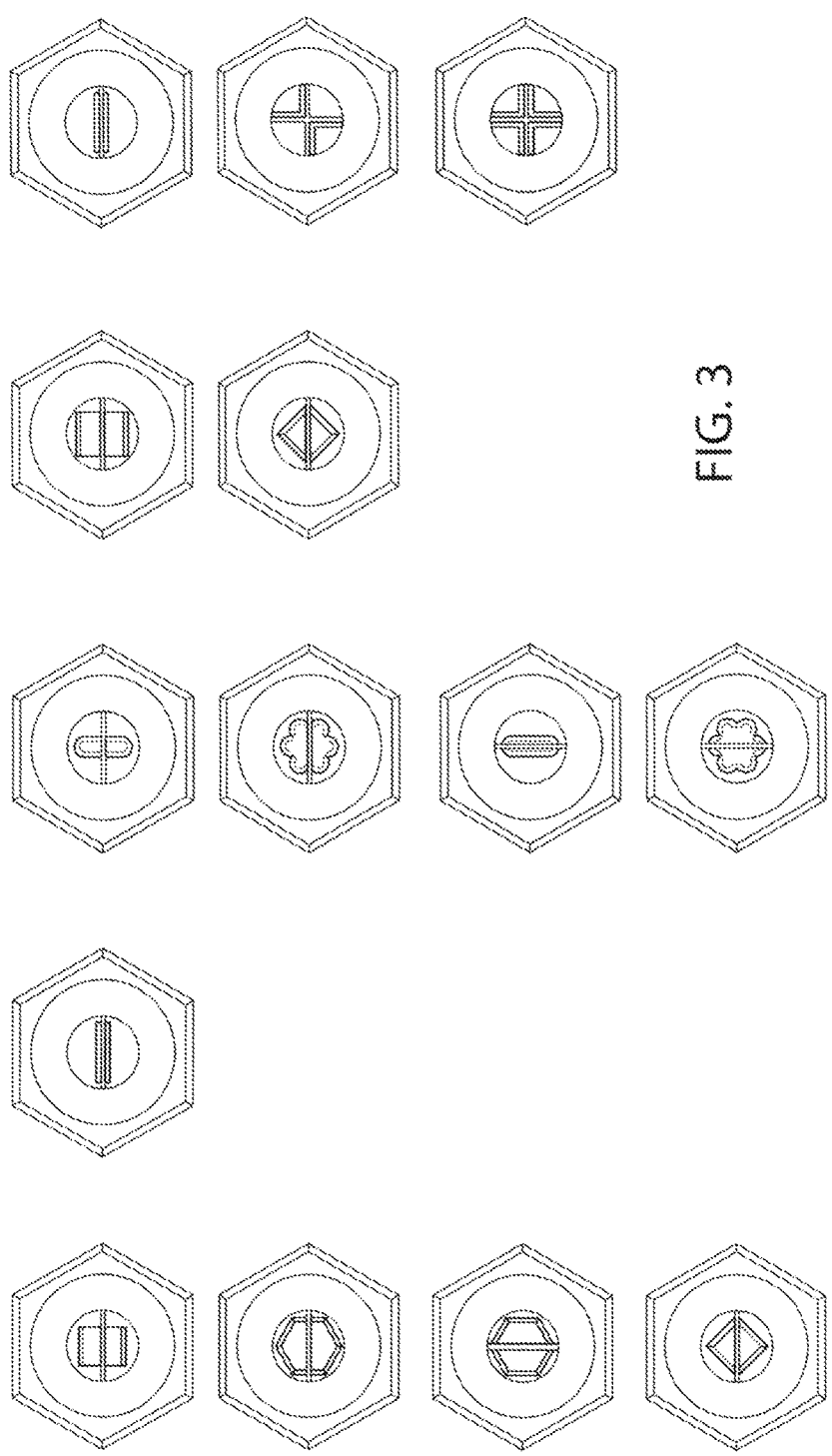

Turning now to FIG. 3, fastener 86 is illustrated having a hexagonal socket 88 formed in and below a top surface 90. Socket 88 may include first and second substantially vertical surfaces 92, 94, with the first substantially vertical surface 92 being positioned on a generally opposite side of the socket 88 from the second substantially vertical surface 94. Again considering FIG. 2, the hexagonal peripheral profile presented by the ends 64, 66 of driver 50 is complementary in shape to the hexagonal socket 88 of fastener 86. However, in the resting positions of cantilever beams 56, 58—i.e., the pre-assembly positions, which in many embodiments means before flexure—the hexagonal peripheral profile presented by ends 64, 66 is slightly larger in dimension (OD) than the corresponding dimension(s) of the hexagonal socket 88 of fastener 86. To assemble driver 50 to fastener 86, cantilever beams 56, 58 may be flexed or bent toward each other by generally opposing forces having components vectored along F (see FIG. 2) to reduce the span of the ends 64, 66 of driver 50 along oversized dimension OD and permit full insertion into or assembly with the hexagonal socket 88 of fastener 86.

Figure 4:
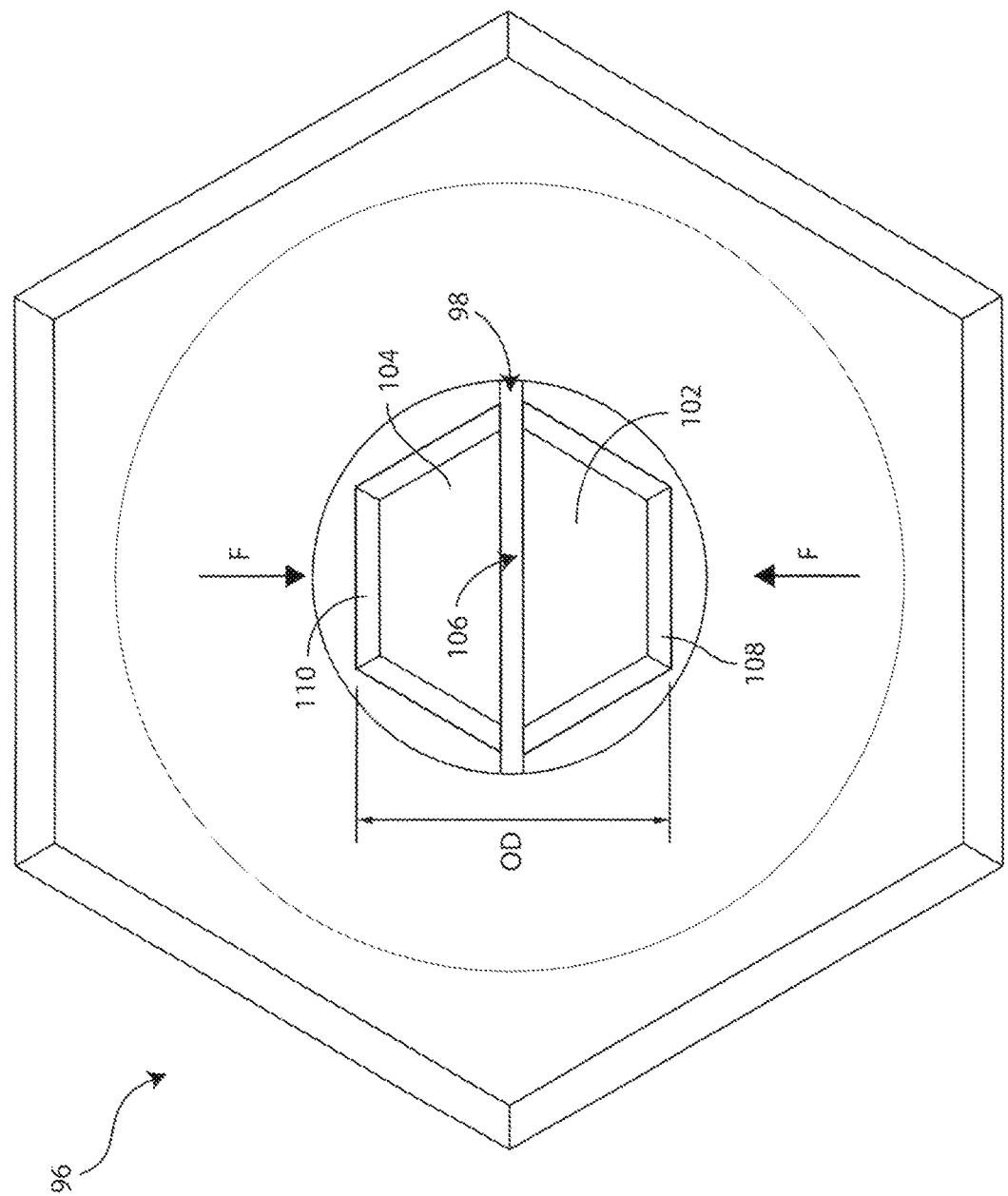
FIG. 4 is a front view of a driver according to the present inventive concept presenting a hexagonal peripheral profile bisected through two opposite corners by a gap.

Turning to FIG. 4, a closely similar driver 96 is illustrated presenting a complementary peripheral profile to the hexagonal socket 88 of fastener 86. However, in contrast with the gap 68 of driver 50, gap 98 of driver 96 splits the hexagonal peripheral profile evenly across two corners to form cross-sections shaped substantially as isosceles trapezoids. It is foreseen that a variety of gap locations—even including locations between asymmetrical cantilever beams—may be employed without departing from the spirit of the present inventive concept. Driver 96 additionally includes a shank, tips 102, 104, open end 106, and angled entry surfaces 108, 110.

Figure 5:
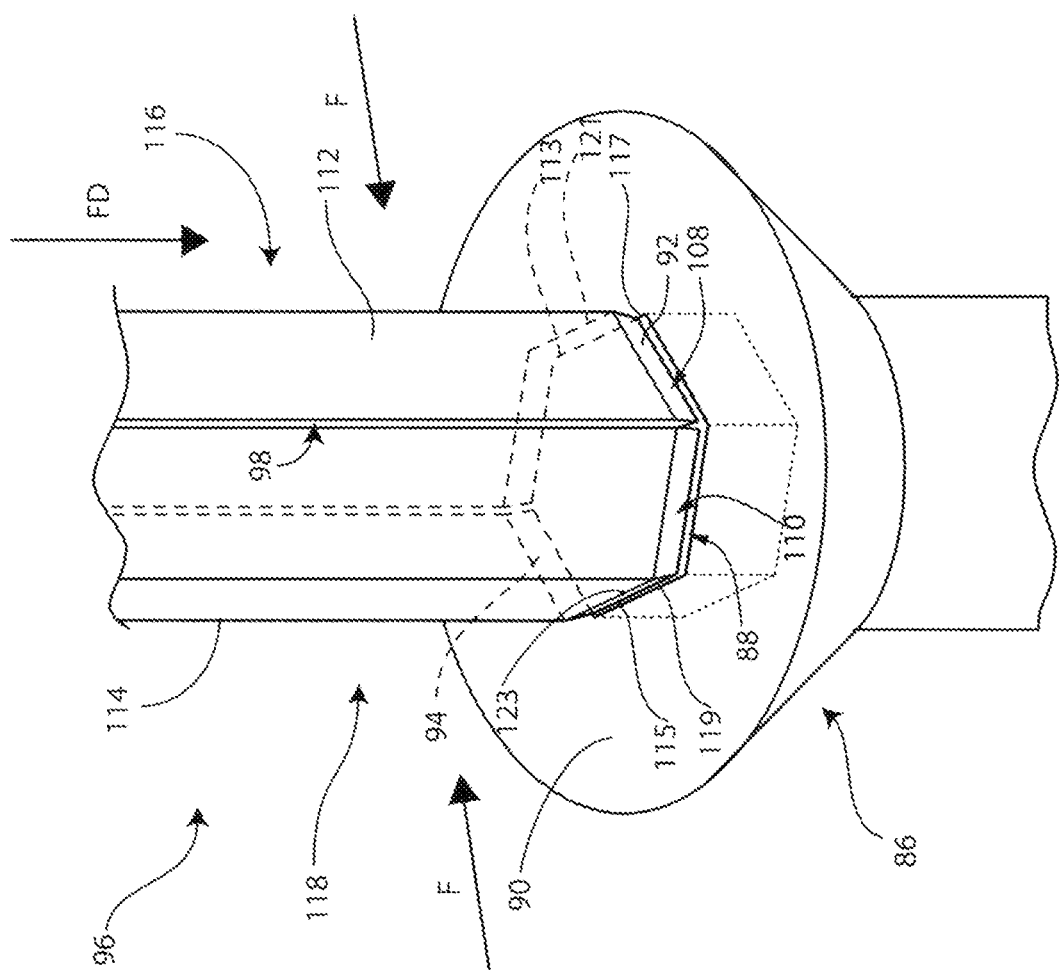
FIG. 5 is a side perspective view of the driver of FIG. 4 just before insertion into a fastener having a hexagonal socket.

Turning to FIG. 5, driver 96 also includes outward-facing surfaces 112, 114 of ends 116, 118, respectively. Preferably, all or some of opposing inner edges 113, 115 of angled entry surfaces 108, 110 are separated by a shorter span than corresponding opposing upper lip segments 117, 119 of socket 88. In this manner, following alignment, driver 96 may be at least partly assembled to fastener 86 by applying downward force having a component directed along FD to move the driver 96 into socket 88. More particularly, inner edges 113, 115 of angled entry surfaces 108, 110 may be aligned with socket 88 and rested just inside of and below the lip segments 117, 119 of socket 88. Opposing outer edges 121, 123 of angled entry surfaces 108, 110 along over-sized dimension OD may rest just above and outside of corresponding lip segments 117, 119 of socket 88.

To complete assembly of driver 96 with socket 88, additional force having a component along FD may be applied to press ends 116, 118 deeper into socket 88. Force directed along FD causing contact with socket 88 may generate reaction forces exerted by the walls and lips of socket 88 on ends 116, 118. Of particular importance, reaction forces may be applied by opposing lip segments 117, 119 of socket 88 onto portions of angled entry surfaces 108, 110. These reaction forces tend to move or flex opposing cantilever beams of driver 96 toward each other and into gap 98, effectively reducing the span of the profile presented by ends 116, 118 along dimension OD. Inward-facing surfaces of the ends 116, 118 may be brought in close proximity (leaving at least a portion of the gap 98) or may abut one another following flexure and assembly.

It is noted that other pinching or squeezing forces having components vectored along F may additionally or alternatively be applied to achieve the aforementioned flexure of the ends 116, 118. For example, fingers may move, or a lever or button may actuate movement of a pinching mechanism mounted to the driver 96 to pinch, the ends 116, 118 together (not shown). It is also noted that some or all of the force required for assembly may be applied to the fastener 86—for example in a direction opposite to vector FD in order to push the lip segments 117, 119 of the fastener 86 past the entry surfaces 108, 110—without departing from the spirit of the present invention.

The force(s) along FD, in the reverse direction of FD, and/or along F may be steadily and/or increasingly applied until driver 96 is fully assembled with socket 88.

It is foreseen that drivers according to the present inventive concept may be assembled to fasteners without the use of angled entry surfaces—for example through increased reliance on pinching or squeezing forces to reduce the span of the profile presented by a driver along a dimension OD—without departing from the spirit of the present inventive concept.

Once driver 96 is fully seated in socket 88, installation of the fastener 86 into a receiving surface (for example, into a pilot hole in a piece of sheet metal or board) may begin. As introduced above, during movement and/or torqueing of the assembled driver 96 and fastener 86, there is risk that the driver 96 may "cam out" or otherwise be unsettled from its seat in socket 88. This may cause stripping of valuable surfaces defining socket 88 and/or loss of the fastener 86. However, such stripping and/or cam out is resisted by forces applied by the driver 96. For instance, ends 116, 118 are resilient, and the flexing required to insert driver 96 into fastener 86 generates reaction forces within the ends 116, 118 that urge them outward toward their original positions. In essence, these reaction forces are applied via outward-facing surfaces 112, 114, on substantially vertical surfaces and/or lip segments 117, 119 of socket 88. The force(s) of friction resulting from these reaction forces lead to better grip on the fastener 86 and resistance to cam out and/or stripping.

Returning briefly to FIG. 3, the variety of illustrated common fastener heads are again noted along with the corresponding drivers according to embodiments of the present inventive concept arranged in columns below. The drivers each include two or more cantilever beams and one or more gap(s) between cantilever beams. The outward-facing surfaces of the ends of the cantilever beams are of varying shapes and configurations, and are generally configured to engage at least two opposing vertical surfaces and/or lip segments of the corresponding fastener socket. The gaps between cantilever beams are of varying orientations, widths and/or lengths.

For example, the drivers beneath hexagonal socket fastener 86 each include two opposing outward-facing surfaces respectively located on the ends of two cantilever beams. The outward-facing surfaces of each such driver, when assembled to the fastener 86, are pressed outward against at least two opposing substantially vertical surfaces and/or lip segments of socket 88. Upon completion of assembly, the brunt of the gripping forces applied by the driver is felt along opposing surfaces of socket 88 which are in contact with the outward-facing surfaces and which are angled in direct opposition to the outward reaction forces applied by resilient flexing of the ends of the cantilever beams. For instance, the greatest amount of force will be applied by driver 96 on opposing substantially vertical surfaces 92, 94 (and/or on their corresponding opposing lip segments) when driver 96 is assembled to fastener 86 such that gap 98 is parallel to the substantially vertical surfaces 92, 94.

Similarly, the outward-facing surfaces of the driver illustrated beneath the "slotted" fastener 120 may be pushed into socket 122 formed in and below top surface 128 for assembly, and such outward-facing surfaces may press outward against opposing substantially vertical surfaces 124, 126 and/or their corresponding lip segments; the outward-facing surfaces of the drivers underneath the TORX®-brand fastener 130 may be pushed into socket 132 formed in and below top surface 138 and press outward against at least two opposing substantially vertical surfaces (e.g., 134, 136) and/or their corresponding lip segments; the outward-facing surfaces of the drivers underneath the square fastener 140 are pushed into socket 142 formed in and below top surface 148 and press outward against at least two opposing substantially vertical surfaces (e.g., 144, 146) and/or their corresponding lip segments; and the outward-facing surfaces of the drivers underneath the Phillips or combination fastener 150 are pushed into socket slot 152 and/or socket slot 154, in each case formed in and below top surface 156, and press outward against at least two opposing substantially vertical surfaces of socket slots 152, 154 and/or their corresponding lip segments. It is also noted that the bottom driver beneath fastener 150 includes third and fourth cantilever beams, enabling flexure of each of the four beams in at least two directions. In each case, reaction forces are applied via outward-facing surfaces on surrounding walls and/or lip segments of the corresponding socket. The force(s) of friction created by these reaction forces at the interfaces between outward-facing surfaces and substantially vertical socket surfaces and/or lip segments may help resist cam out and/or help prevent stripping.

Figure 6A:
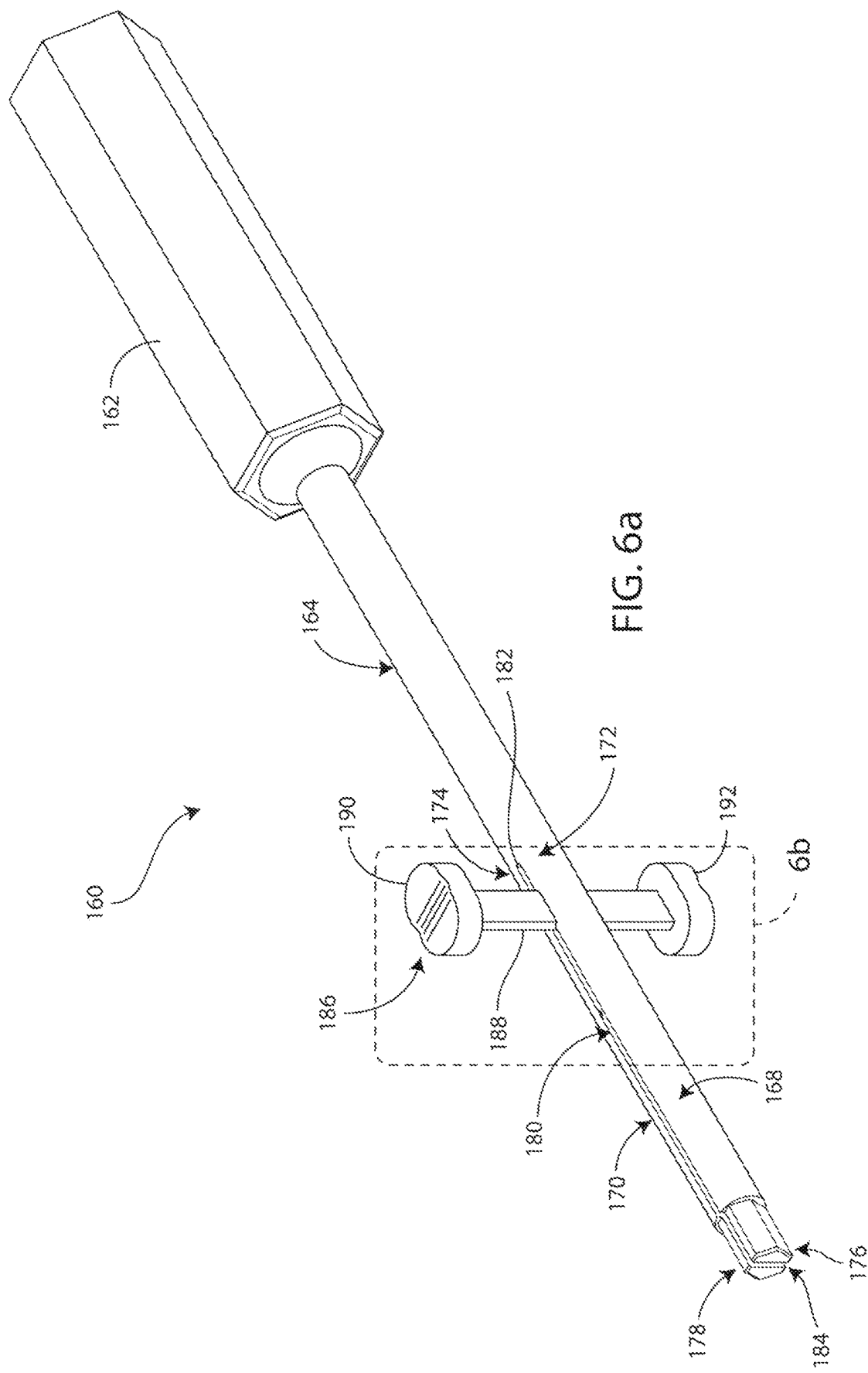
FIG. 6a is a side perspective view of a driver according to the present inventive concept including a sliding shim for enhancing fastener gripping.

Turning now to FIG. 6a, a driver 160 according to an embodiment of the present inventive concept is illustrated. Driver 160 includes a handle 162, a shank 164 extending from and fixed to the handle 162, and two cantilever beams 168, 170 extending from the shank 164. Cantilever beams 168, 170 respectively include basal segments 172, 174 fixed to or integral with the shank 164, as well as ends 176, 178 opposite the basal segments 172, 174. Cantilever beams 168, 170 define a gap 180 between them that extends from a terminus 182 at shank 164 to an open end 184. A sliding shim 186 including a shim bar 188 is positioned in the gap 180. The shim bar 188 preferably comprises material exhibiting a high compression strength, and the shim bar 188, shank 164 and cantilever beams 168, 170 may comprise the same steel alloy in some embodiments, though it is foreseen that different materials may be employed without departing from the spirit of the present inventive concept.

The sliding shim 186 includes grips 190, 192 along opposite sides of the shim bar 188. The grips 190, 192 preferably comprise a rubber and/or other textured material providing ample friction and grip to an operator's fingers for actuating manual movement of the sliding shim 186 along gap 180. It is foreseen that movement of the sliding shim 186 may also or alternatively be actuated using a lever or similar mechanism for multiplying the force applied on the sliding shim 186 without departing from the spirit of the present inventive concept.

As with other drivers described above, assembly of driver 160 to fastener 86 includes flexing ends 176, 178 toward one another into the gap 180, and insertion of the ends 176, 178 into socket 88. The separation between cantilever beams 168, 170 following such flexure and insertion varies along the length of the cantilever beams 168, 170, the degree of separation being greatest near terminus 182 and smaller near open end 184. In this configuration, in the manner discussed in more detail above, the ends 176, 178 apply outward forces on the surrounding socket 88. To increase the outwardly-directed forces and resistance to cam out and/or stripping—for example in particularly rigorous or increased torque applications—sliding shim 186 may be utilized. The sliding shim 186 may be moved toward the ends 176, 178 to increase the outwardly-directed forces applied on the socket 88, and may be moved away from the ends 176, 178 to reduce such forces (for example to facilitate disassembly of the driver 160 from the fastener 86).

Figure 6B:
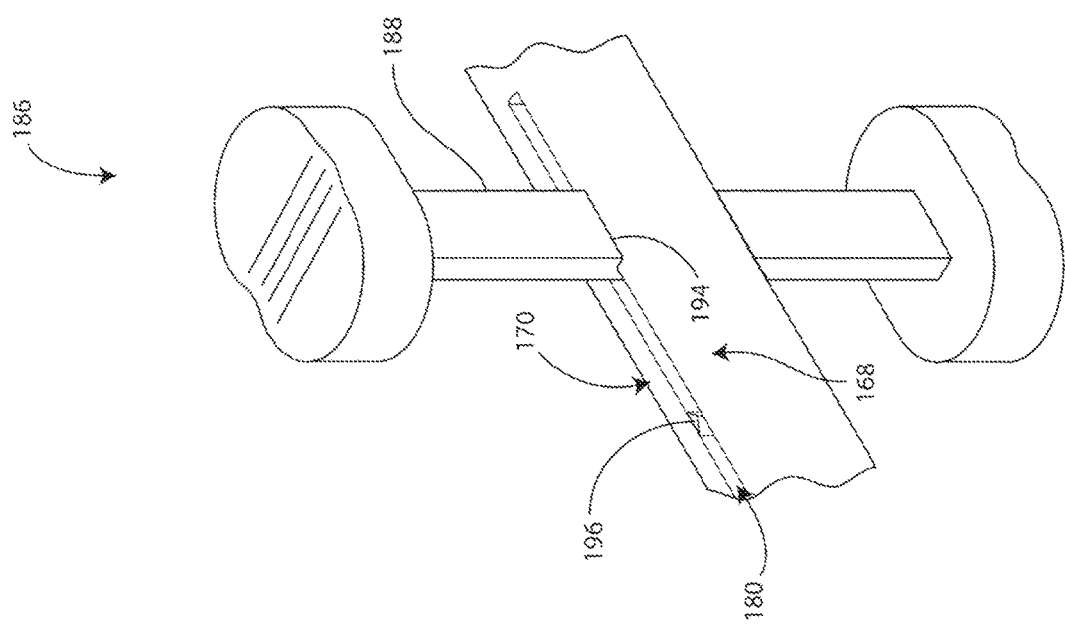

Turning now to FIG. 6b, additional detail is illustrated from a side view for a portion of driver 160 including sliding shim 186. Driver 160 includes a stop 196 comprising a protrusion configured to prevent further movement of the sliding shim 186 along the length of cantilever beams 168, 170 and thus avoid inadvertent removal of the sliding shim 186 from the open end 184. It is foreseen that stop 196 may take a variety of shapes and configurations without departing from the spirit of the present inventive concept.

The shim bar 188 also includes a fin 194 along each side of gap 180. Each fin 194 is essentially a fattened segment of the shim bar 188—as compared with the portion of shim bar 188 that resides in gap 180—situated on a side of gap 180. Each fin 194 tends to reduce or prevent lateral movement of the shim bar 188 within the gap 180, instead permitting only movement along the longitudinal axis of driver 160. It is foreseen that a rail (not shown) or other known system for restricting movement to one axis and/or at a certain point along that axis may be used with the sliding shim without departing from the spirit of the present inventive concept.

Figure 7:
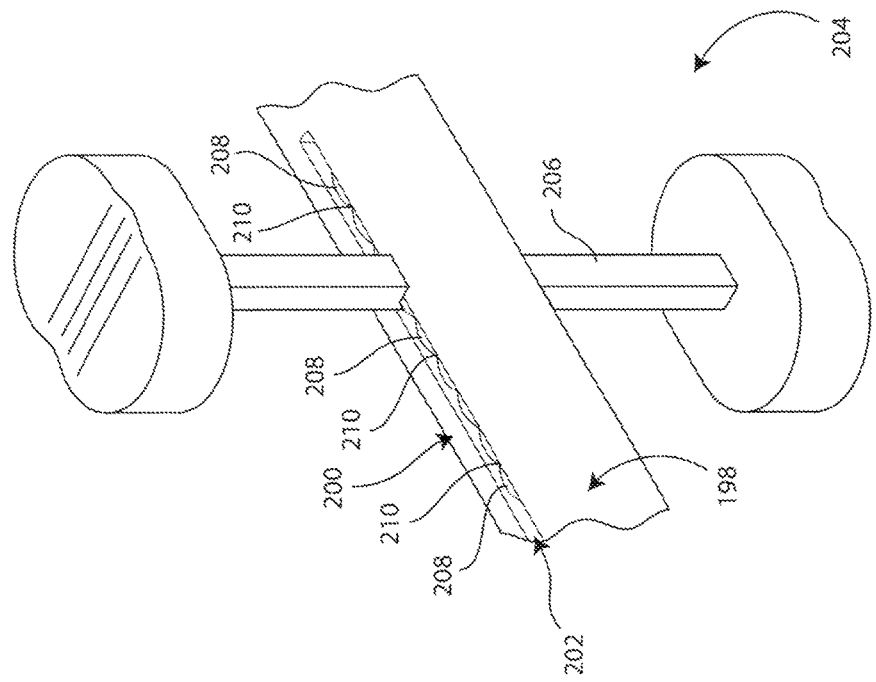
FIG. 7 is a side view of a portion of a gap and a sliding shim of a driver according to the present inventive concept that includes a track of protrusions for temporarily securing the sliding shim during incremental advancement along the driver.

Turning to FIG. 7, a variation on the portion of driver 160 illustrated in FIG. 6b is illustrated. It is initially noted that, with certain exceptions to be discussed in detail below, many of the elements of the driver of FIG. 7 are the same as or very similar to those described in relation to driver 160 above. Therefore, for the sake of brevity and clarity, redundant descriptions will generally be avoided here. Unless otherwise specified, the detailed descriptions of the elements presented above with respect to the driver 160 should therefore be understood to apply at least generally to this embodiment as well.

Cantilever beams 198, 200 define a gap 202 therebetween. A sliding shim 204 having a shim bar 206 is positioned in gap 202. A series of aligned protrusions 208 forming a track along cantilever beam 198 extends down the length of gap 202. Protrusions 208 define a series of cradles 210 therebetween. Shim bar 206 and protrusions 208 are respectively dimensioned to provide clearance for shim bar 206 to slide along the full operable length (i.e., all the way to a stop or other permanent obstacle or to the open end of gap 202) of resting cantilever beams 198, 200.

Upon assembly to a fastener 86, however, cantilever beams 198, 200 are pressed together to varying degrees along the longitudinal axis, as described above. Therefore, upon assembly to a fastener 86, less clearance is provided between the apexes of the protrusions 208 and the cantilever beam 200 the nearer sliding shim 204 gets to the fastener 86. Successive cradles 210 are increasingly difficult to reach the closer the shim 204 slides to the fastener 86. Put another way, moving shim 204 from a cradle 210 that is closer to an assembled fastener 86 requires more force than moving the shim 204 from a cradle 210 that is further from the fastener 86. In turn, more outward force on the socket 88 of the fastener 86 is added by moving the shim 204 toward the fastener 86 to a cradle 210 that is nearer the fastener 86 than to a cradle 210 that is further from the fastener. That is, a greater increase in gripping power is realized by movement toward the fastener 86 between proximate cradles 210 than between distal cradles 210. It is foreseen that fewer cradles may be defined, for example merely a single proximate "locking" cradle and a single distal "unlocking" cradle, and/or that protrusions of the track may take varying shapes, without departing from the spirit of the present inventive concept.

Turning to FIGS. 8a and 8b, a driver 212 according to another embodiment of the present inventive concept is illustrated. It is initially noted that, with certain exceptions to be discussed in detail below, many of the elements of the driver 212 are the same as or very similar to those described in relation to the drivers of embodiments discussed above. Therefore, for the sake of brevity and clarity, redundant descriptions will generally be avoided here. Unless otherwise specified, the detailed descriptions of the elements presented above should therefore be understood to apply at least generally to this embodiment as well.

Driver 212 includes a handle 214, a shank 216, and cantilever beams 218, 220 defining a gap 222 therebetween. Cantilever beams 218, 220 respectively include ends 224, 226. Ends 224, 226 respectively have tips 228, 230 and outward-facing surfaces 232, 234. A sliding shim 236 is positioned in gap 222.

Gap 222 of driver 212 has variable width along a longitudinal axis when the cantilever beams 218, 220 are in resting positions. More particularly, gap 222 gradually narrows as it approaches ends 224, 226. The hexagonal profile defined by the cross-sections of ends 224, 226 may have a minimal or no oversized dimension in the resting position, but instead may be configured to fit snugly within socket 88 of fastener 86 with little or no flexure of cantilever beams 218, 220 from their resting positions. Therefore, cantilever beams 218, 220 are flexed to a lesser degree, or may not be flexed at all, to facilitate assembly to fastener 86. Instead, all or a large part of the added grip or outward force applied to socket 88 of fastener 86 upon assembly may be generated by moving sliding shim 236 closer to fastener 86 following assembly, generally in the manner described above in connection with the driver 160. Again, it is foreseen that other features disclosed herein—for example the stop and track of protrusions described in connection with FIGS. 6b and 7—may be utilized with the driver 212 without departing from the spirit of the present inventive concept.

It is foreseen that other drivers may be configured according to the present inventive concept to operate with various fastener types and dimensions, and may be designed to maximize the contact surface area for torqueing a particular socket shape and/or to maximize the number of different fasteners with which a driver may be used, without departing from the spirit of the present inventive concept. Drivers according to embodiments of the present inventive concept may be constructed of steel alloy and may be tipped with nickel and/or chromium. The choice of steel alloy may be informed by consideration of an alloy's density, Young's Modulus, yield strength, ultimate tensile strength, elongation at failure and other known physical properties affecting driver design and performance. The choice should, however, also be informed by considering the friction forces required to keep the driver firmly seated within a fastener during a variety of applications, and by the related variables of cantilever beam length, gap width and degree of intended flexure. The choice of material may also be influenced by the coefficients of friction presented by the various materials under consideration, though variation of these properties between commonly used alternatives may in some cases be negligible or overwhelmed by other design considerations. The shank and cantilever beams of a driver may comprise the same or different materials, and may be joined or integral, without departing from the spirit of the present inventive concept. One exemplary embodiment includes a driver designed for installing a standard #2-56 hexagonal socket fastener. The driver may comprise AISI$^{SM}$ 8650 Nickel-chromium-molybdenum steel (temper 1000° F.), and may include a gap having a length of one inch (1") and a width of two thousandths of an inch (0.002").

It is foreseen that a wide variety of materials and dimensions may be chosen for drivers by one having ordinary skill in the art following review of this disclosure without departing from the spirit of the present inventive concept. It is also foreseen that known fastener-gripping features—such as outer edge- and/or magnetic-gripping features described above—may supplement features set forth herein without departing from the present inventive concept.

Having now described the features, discoveries and principles of the general inventive concept, the manner in which the general inventive concept is constructed and used, the characteristics of the construction, and advantageous, new and useful results obtained; the new and useful structures, devices, tools, elements, arrangements, parts and combinations, are set forth in the appended claims. It is also to be understood that the following claims are intended to cover all of the generic and specific features of the general inventive concept herein described, and all statements of the scope of the general inventive concept which, as a matter of language, might be said to fall therebetween.

The invention claimed is:

1. A driver for gripping a socketed fastener head, the driver comprising:
   a shank;
   two spaced-apart cantilever beams extending from the shank and defining a longitudinal gap between them, each cantilever beam having an end and a basal segment adjacent the shank, the basal segments of the two cantilever beams being immovable relative to the shank;
   a sliding shim positioned in the gap, the sliding shim and the cantilever beams being configured so that movement of the sliding shim toward the ends increases outward forces on the cantilever beams for gripping the socketed fastener head; and
   a stop protrusion extending into the gap and configured to contact and engage with the sliding shim to prevent movement of the sliding shim beyond the stop protrusion in the direction of the ends.

2. The driver of claim 1, wherein the socketed fastener head presents a top surface, a socket is formed in and below the top surface, and the socket presents a first substantially vertical surface and a second substantially vertical surface across the socket from the first substantially vertical surface, with the driver comprising an outward-facing surface on the end of each of the two cantilever beams, the outward-facing surfaces being oriented, when assembled to the socketed fastener head, to apply forces outward on the first and second substantially vertical surfaces in response to bending of the two cantilever beams from resting positions.

3. The driver of claim 2, wherein the two ends are configured to abut one another when assembled to the fastener.

4. The driver of claim 2, wherein the driver is configured such that at least a portion of the gap between the ends remains when the driver is assembled to the socketed fastener head.

5. The driver of claim 1, wherein the ends of the cantilever beams each present a cross-section having the shape of an isosceles trapezoid.

6. The driver of claim 1, wherein the ends of the cantilever beams each present a cross-section having a rectangular shape.

7. The driver of claim 1, wherein each end of the two cantilever beams includes a tip and a substantially orthogonal outward-facing surface.

8. The driver of claim 1, wherein each end of the two cantilever beams includes a tip, an outward-facing surface, and an angled entry surface between the tip and the outward facing surface configured to facilitate insertion of the driver into the socketed fastener head.

9. The driver of claim 1, further comprising a track of translational protrusions extending inside the gap between the stop protrusion and the shank, the track of translational protrusions defining cradles therebetween for receipt of the sliding shim and incremental movement of the sliding shim with respect to the track of translational protrusions and along the gap.

10. The driver of claim 1, wherein the gap defined by the two cantilever beams in resting positions narrows as it extends from the shank toward the ends.

11. The driver of claim 1, wherein the sliding shim includes fins positioned on opposite sides of the gap.

12. A driver for gripping a socketed fastener head, the driver comprising:
    a shank;
    a handle fixed relative to the shank in a longitudinal direction;
    two spaced-apart cantilever beams fixed relative to the shank in the longitudinal direction, extending from the shank in the longitudinal direction, and defining a longitudinal gap between them, each of the two cantilever beams having a basal segment adjacent the shank and an end terminating at a tip;
    a sliding shim configured for translational movement relative to the cantilever beams, the sliding shim having a lateral length extending to opposite sides of the cantilever beams, a gap segment between the cantilever beams, and first and second fins positioned on the opposite sides of the cantilever beams, the first and second fins each having a thickness that is greater than a thickness of the gap segment in a direction, the direction being substantially orthogonal to the longitudinal direction and also being substantially orthogonal to the lateral direction, the greater thicknesses of the fins being configured to restrict movement of the sliding shim in the lateral direction; and
    a stop protrusion extending into the gap and configured to prevent movement of the sliding shim beyond the stop protrusion in the direction of the ends.

13. The driver of claim 12, further comprising a track of translational protrusions extending inside the gap between the stop protrusion and the shank, the track of translational protrusions defining cradles therebetween for receipt of the sliding shim and incremental movement of the sliding shim with respect to the track of translational protrusions and along the gap.

14. The driver of claim 12, wherein the gap defined by the two cantilever beams in resting positions narrows as it extends from the shank toward the open end.

15. A method for installing a fastener having a socketed head presenting a top surface and a socket formed in and below the top surface, the method comprising:
- providing a driver having two cantilever beams and a shank, each cantilever beam including an outward-facing surface, an end, and a basal segment adjacent the shank, the basal segments of the two cantilever beams being immovable relative to the shank;
- aligning the driver with a socket of the socketed fastener head;
- applying a force to the shank of the driver generally in the direction of the socketed fastener head causing the cantilever beams to move toward one another to permit at least partial insertion into the socket;
- applying a force to a sliding shim in a gap between the cantilever beams generally in the direction of the socketed fastener head to press the sliding shim in a translational movement, thereby applying a pressure on the socket; and
- settling the sliding shim against a stop protrusion positioned in the gap between the two cantilever beams, the stop protrusion in the gap preventing movement of the sliding shim beyond the stop protrusion in the direction of the socket.

16. The method of claim 15, further comprising, prior to settling the sliding shim against the stop protrusion, translating the sliding shim over a translational protrusion of a track of translational protrusions extending inside the gap between the stop protrusion and the shank.

17. The method of claim 16, further comprising settling the sliding shim in a cradle defined between the translational protrusion and a next-adjacent translational protrusion of the track of translational protrusions.

18. The method of claim 17, comprising torqueing the driver to install the socketed fastener in a receiving surface followed by applying a force to the sliding shim generally in a direction opposite the socketed fastener head to at least partially reduce the pressure applied by the cantilever beams on the socket.

19. The method of claim 18, wherein the force in the direction opposite the socketed fastener head moves the sliding shim out of the cradle, over the translational protrusion and away from the next-adjacent translational protrusion.

* * * * *